(12) United States Patent
Bürkle et al.

(10) Patent No.: US 6,815,070 B1
(45) Date of Patent: Nov. 9, 2004

(54) POLYMER-COATED THIN GLASS FILM SUBSTRATES

(75) Inventors: Roland Bürkle, Kirchentellinsfurt (DE); Silke Deutschbein, Mainz (DE); Reiner Mauch, Ingelheim (DE); Karl-Heinz Sossenheimer, Wackernheim (DE); Andreas Weber, Mainz (DE)

(73) Assignee: Schott Spezialglas GmbH, Mainz (DE)

( * ) Notice: Subject to any disclaimer, the term of this patent is extended or adjusted under 35 U.S.C. 154(b) by 0 days.

(21) Appl. No.: 10/030,773

(22) PCT Filed: Apr. 17, 2000

(86) PCT No.: PCT/EP00/03471
§ 371 (c)(1),
(2), (4) Date: Jan. 29, 2002

(87) PCT Pub. No.: WO00/66507
PCT Pub. Date: Nov. 9, 2000

(30) Foreign Application Priority Data

Apr. 30, 1999 (EP) .............................................. 99108440

(51) Int. Cl.$^7$ ..................... B32B 27/00; B32B 17/10; B05D 5/06; C03B 17/06
(52) U.S. Cl. ..................... 428/425.6; 428/441; 428/430; 428/412; 428/415; 427/165; 427/166; 427/168; 427/169; 427/553; 65/66; 65/90
(58) Field of Search .............................. 428/425.6, 426, 428/441, 430, 213, 412, 415, 417, 435; 315/169.3; 427/165, 166, 168, 169, 553; 65/66, 90

(56) References Cited

U.S. PATENT DOCUMENTS

| | | |
|---|---|---|
| 4,388,368 A | 6/1983 | Hibino et al. |
| 5,230,374 A | 7/1993 | Dawson et al. |
| 5,578,243 A | 11/1996 | Mazaki et al. |
| 6,120,907 A | 9/2000 | Tahon et al. |
| 6,197,418 B1 | 3/2001 | Cloots et al. |
| 6,261,649 B1 | 7/2001 | Takagi et al. |
| 6,268,058 B1 | 7/2001 | Tahon et al. |
| 6,287,674 B1 * | 9/2001 | Verlinden et al. ........... 428/210 |
| 6,322,860 B1 * | 11/2001 | Stein et al. ................. 428/1.26 |

FOREIGN PATENT DOCUMENTS

| | | |
|---|---|---|
| DE | 3127721 A1 | 2/1983 |
| DE | 36 15 277 A1 | 11/1986 |
| DE | 196 06 386 A1 | 8/1997 |
| EP | 0 272 875 | 6/1988 |
| EP | 0 669 205 | 8/1995 |
| EP | 0 759 565 | 2/1997 |
| EP | 0 791 454 | 8/1997 |

(List continued on next page.)

OTHER PUBLICATIONS

"Image Processing Method" IBM Technical Disclosure Bulletin, Bd. 40, Nr. 1, Jan. 1, 1997, Seiten.
International Search Report dated Sep. 15, 2000, PCT/EP00/03471.
U.S. App. Ser. No. 09/869975 filed on Sep. 6, 2001 entitled: Polymer–Coated Thin Glass Film Substrates and currently pending claims.

*Primary Examiner*—Deborah Jones
*Assistant Examiner*—G. Blackwell-Rudasill
(74) *Attorney, Agent, or Firm*—Baker & Daniels

(57) ABSTRACT

The invention relates to a glass-plastic composite film, especially for use in electronic components and devices, such as displays. The inventive film consists of a glass film which is between 10 μm and 500 μm thick, and is characterised in that a polymer layer with a thickness of between 1 μm and 200 μm f is applied directly to at least one of the side faces of said film and in that at least one side on the surface of the film has a waviness of less than 100 nm and a roughness $R_T < 30$ nm.

40 Claims, 1 Drawing Sheet

FOREIGN PATENT DOCUMENTS

| | | |
|---|---|---|
| EP | 0 838 723 | 4/1998 |
| EP | 0 949 850 | 10/1999 |
| GB | 1 319 846 | 6/1973 |
| GB | 2 335 884 A | 4/1998 |
| JP | 4235527 A | 11/1991 |
| KR | A-98-3695 | 3/1998 |
| WO | WO 99/21707 | 5/1999 |
| WO | WO 99/21708 | 5/1999 |

* cited by examiner

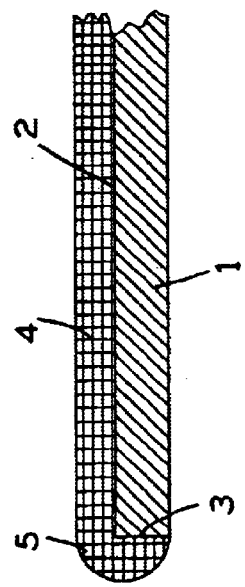
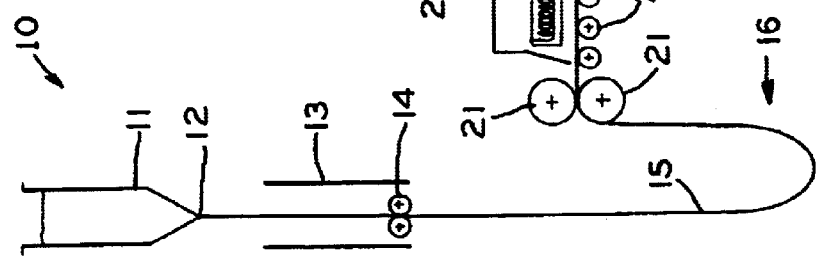

POLYMER-COATED THIN GLASS FILM SUBSTRATES

The invention relates to a glass-plastic composite film, especially for use in electronic components and devices, such as displays, consisting of a glass film which is between 10 μm and 500 μm thick, and a polymer layer with a thickness between 1 μm and 200 μm applied to at least one of its side faces. Furthermore, it relates to methods for manufacturing said glass-plastic composite film and using the same.

Flat glass substrates are a suitable substrate material for many applications where transparence, high chemical and thermal resistance and defined chemical and physical properties are important. In particular, these are the areas of application where the methods for thin film and thick film technology are used, such as displays, thin and thick film sensors, solar cells, micro-mechanical components and lithographic masks. In recent times, the demand for new product functionalities and areas of applications has called for ever thinner and ultra-thin substrates that have the known good properties of glass substrates, but also have new properties, in part, such as flexibility. Again, the typical fields of application are electronic applications, such as sensors and membrane elements.

Especially in displays, for example liquid crystal displays (LCD), the trend is increasingly moving toward a more appealing design and therefore new functionalities are required. In particular, these are ultra-thin and especially light displays, for example for portable pocket devices, flexible displays for devices with a rounded housing form, such as cell phones or round pin-type devices or displays for smart cards or shelf price tags or displays that are based on organic or inorganic light emitting layers, the so-called light emitting organic polymer displays (OLED).

Generally, this type of display is structured as follows: The core is a cell that houses the liquid crystals or the polymers. It is provided with a front and a rear plate on which electrodes are applied. In most liquid crystal displays the front and rear walls of the cell are both joined by a polarizer. In reflective displays, a reflector plate is provided behind the rear polarizer. In the case of the emitting polymers the counterelectrodes can also be vapor-deposited directly to the polymer before the display is sealed with the rear plate. In order for the display to function as well as possible it must be ensured, for example, that the liquid crystals are able to align as evenly as possible and that the electrode pairs all have the same distance from each other, if possible, as otherwise distortions or localized intensity fluctuations will occur in the display. One influencing factor is the surface quality of the substrates used for manufacturing the individual components.

Preferred substrate materials for manufacturing the individual components are glass and plastic. The special advantages of glass are that it is chemically and photo-chemically inert, optically isotropic, temperature-resistant, mechanically stable and it also has a hard surface. However, it has a relatively high density, it is brittle and thus highly susceptible to breaking. Breaking glass in the production process not only causes losses for the manufacturer because of high waste, but also because of the fact that the process has to be stopped every time so as to remove all splinters from the machines.

Plastics have a lower density and they are elastic and resistant to breaking, but they also have various disadvantages: In the past few years, substrate materials have been developed and manufactured on the basis of high quality plastic films for manufacturing displays as a replacement for thin glass substrates. All these films require complex special manufacturing processes so as to achieve the required properties. Such complex manufacturing processes make the substrates considerably more expensive. It was also found that in spite of considerable development efforts the water and vapor permeability of such substrate films cannot be adequately reduced. The consequences are that the quality and the lifetime of the LCDs made of such substrate films are highly limited. In the so-called OLEDs the oxygen diffusing through the film will result in oxidizing the organic semiconductor layers and the electrodes consisting of base metals and thus it will also reduce the lifetime of the displays. When plastic is used as a protective layer for the display the susceptibility to scratches will reduce the lifetime.

Similar to the safety glass industry, attempts are being made to combine the favorable properties of glass with the good properties of plastic: In DE-OS 36 15 277 A1, glass panes are coated with plastic by means of melting on so as to provide protection against splintering. DE-OS 31 27 721 A1 specifies plastic sheets which are coated with glass films as scratch protection where the coating takes place under the effects of pressure and/or heat, but preferably using an intermediate inserted hot-melt adhesive film.

Analogous, several examples are known in the field of display technology where the properties of glass and plastic are combined. An approach of providing glass with a protective plastic layer is known from the Korean disclosure of patent KR-A 98-3695. In all probability, the glass is brought to the desired thickness by means of etching and the protective plastic layer then has to close the pores caused by the etching and also serve as protection against breaking.

The break protecting function primarily consists of preventing the propagation of micro-cracks that already exist. Except for saying that it is a resin from the group of thermosetting plastics the selection of the polymer is not discussed in more detail. Also, it is not disclosed in detail how the protective coat is applied. Assuming a commonly used glass thickness for producing displays at the time of the patent application, which typically was between 0.55 mm and 1.1 mm at that time, and the etched glass surface the glass-plastic composite materials produced thus will not meet the current requirements for display applications.

With regard to the production of polarizer films, DE-OS 196 06 386 A1 describes an oriented optically active dye film of plastic which is applied for mechanical stabilization to a glass film by means of pressing, melting, preferably adhesion. The adhesive agent provides additional mechanical stabilization for the dye film. The thickness of the glass film ranges between 10 and 200 μm, the thickness of the dye film is between 5 and 60 μm.

Applying the dye film is not without problems. With pressing, the scrap as a result of breaking glass is very high; melting is a complex process which can have an adverse effect on the properties of the dye film; adhesion has the following disadvantages: The process of bonding films, in this case a polymer film with a glass film, is also called laminating. Lamination generally takes place in that pressure is applied by means of rollers. This causes considerable stress on the glass film, which, especially with very thin films, results in breaking or damaging the glass film, for example scratching the surface.

At least four separate manufacturing processes are required: manufacturing the thin glass, manufacturing the film, coating with adhesive and the actual laminating process, which results in significant costs. Also, the adhesion and laminating methods have to meet high requirements because the product, especially for display applications, must not contain any air or dust particles. For the selection of the adhesive agents it should be taken into consideration that they generally have a limited temperature and solvent resistance. A homogeneous thickness of the glass laminate cannot be adequately ensured because of fluctuations in the thickness of the ductile adhesive layer.

The use of polymer films in itself is problematic because when the temperature fluctuates they build up considerable pressure and tensile stresses in the laminate because of their high degree of cross-linking. The thermal coefficients of expansion of plastics are higher by an order of magnitude than those of glass. Furthermore, all polymer films are subject to considerable irreversible shrinking following temperature cycles up to near the glass transition temperature of the plastics, which shrinkage can be higher by up to 1 to 2 orders of magnitude than that of glass and which leads to a permanent warping of the laminates. This effect is frequently inhomogeneous and can be anisotropic in the case of oriented films.

Furthermore, polymer films usually have a not insignificant optical retardation (double refraction) which is clearly above 20 nm. In displays which utilize the double refraction effect of liquid crystals an optical anisotropy of the film is not acceptable. The lateral double refraction of a film is the result of the difference in the refraction indices parallel and vertical relative to the process direction of the films. The optical retardation of a film having the thickness d is the product of the difference in the refraction indices parallel and vertical relative to the process direction of the films and the film thickness. For LCD applications utilizing the double refraction of the liquid crystal only substrates or substrate films with an optical retardation <20 nm can be used. Most commercially available drawn films, however, have a multiple of said value. Only a few films are available which are below said value, but they are very expensive because of the more complex manufacturing processes.

For very thin polymer films the fact should be added that they are very difficult to handle in a lamination process and thus will produce poor yields. They are difficult to laminate without warping which may result in additional stresses and distortions of the laminate. Film laminates with a polymer film thickness <25 $\mu$m are virtually impossible to manufacture economically and for industrial production.

The Japanese disclosure of patent JP-A 4235527 specifies a plastic substrate on which a glass film is applied so as to improve the surface quality of the plastic substrate such that an electrically conductive layer for mounting electrodes can be applied. Transparent epoxy resins are the preferred material for the plastic substrate. The substrate thickness can range from 100 $\mu$m up to 10 mm, depending on the intended use, especially when depending on the size of the area of the display to be produced. The thickness of the glass film ranges between 10 $\mu$m and 500 $\mu$m. Either the glass film and the plastic substrate are bonded together or the resin is poured on the glass. Bonding will cause the problems mentioned above, which can have an adverse effect on the optical properties and the surface quality of the end product. Also, a substrate thickness >100 $\mu$m has the disadvantage that the flexibility of the glass-plastic composite films is limited.

For all the above introduced end products it is determined by the end product itself which side is processed further and how it can be processed further. JP-A 4-235527 attempts for the first time to change this in that a glass film is applied to both sides of the plastic substrate. However, at least one process step is required for this, for bonding even at least two additional process steps, plus more material. Therefore, it is considerably more expensive to produce an end product both of whose sides can be further processed.

A material is known from EP 0 838 723 A that is provided with a layer on a glass carrier. Said material is suitable for lithograph prints and for liquid crystal displays. The material comprises a glass carrier which is thinner than 1.2 mm and which is resistant to tensile stresses of up to and above 5×10$^7$ Pa. Furthermore, the edges in longitudinal direction are configured semi-circular with a radius of approximately 0.5 times the thickness of the carrier.

EP 0 272 875 A describes an optical memory card and a method for producing the same where the card consists of plastic and aluminum.

EP 0 759 565 A describes a method for manufacturing a color filter array element. For this, a colored pattern of pixel cells is applied to a thin carrier which is rigid in the horizontal line. Then, a transparent carrier is laminated onto the side of the carrier or the side of the pixel cells, where first a thin glass pane (127 $\mu$m) is coated with polycarbonate by means of spin coating.

After producing the pixel cells a borosilicate glass plate is laminated to the pixel cells under pressure.

In EP 0 669 205 A, a transparent glass-plastic composite sheet was described which consists of at least one transparent plastic sheet, at least one glass pane and an adhesion promoting intermediate layer. The glass pane is a glass film having a layer thickness between 30 and 1000 $\mu$m. The plastic sheet has a thickness of several mm because the composite sheet is intended to be used as a light, scratch-proof glazing in motor vehicles.

A glass-plastic composite film comprising a glass film having a thickness from 4 to 200 $\mu$m which is coated on one or both surfaces with plastic of a thickness of 2 to 200 $\mu$m is described in GB 131 98 46. It is produced either with an adhesive agent or with an adhesion promoter. Alternatively, the plastic can also be applied directly from the liquid phase. The plastics used include polyolefins, PVC, PA, polyvynilidene chloride, cellulose, cellulose acetate, polystyrol or polymer mixes or copolymers of said polymers. Particularly preferred are polyester or polyethylene terephthalate. The glass-plastic composite film specified in GB 131 98 46 is preferably used for film material for drawings or as gas and vacuum impermeable packaging material. Consequently, the optical properties, which are important for the application in the field of electronic components, are not relevant for GB 131 98 46 and are not mentioned in said patent.

The applications WO 99/21707 and WO 99/21708, which were published later, describe laminates consisting of a glass substrate and at least one carrier which can consist of transparent plastic. The glass layer has a thickness from 10 to 450 $\mu$m, and the plastic layer has a thickness of 500 $\mu$m.

The plastic layer can also be applied to the glass without an adhesive agent by means of vacuum lamination. Also proposed is continuous rolling on. If an adhesive agent is used it should be thermally stable up to 200° C. Especially for vacuum lamination it is important that both the plastic and the glass have a low surface roughness, but this is not further quantified. For the adhesive layer silicones, acrylates joy, and polymers that can be cross-linked with UV light are proposed. An adhesion promoter, such as epoxy silane, can also be applied to the glass if a functional layer has to be applied to the glass. The entire laminate can be coated with a sol-gel, if necessary. Because the laminate is to be used especially for displays the plastic and glass should be selected so as to have a similar refraction index.

WO 99/21708 describes a method for manufacturing semiconductor devices in that a functional layer is applied to a substrate where the substrate is a laminate consisting of a carrier and a glass layer having a thickness of less than 700 µm. It is substantially a laminate like the one described in WO 99/21707.

In the subsequently published GB 233 58 84 a component is used as a protective element for optoelectronic or electronic components comprising at least one electrically active organic layer, where the component comprises a glass layer having a thickness of >200 µm and a plastic layer, where the plastic layer has a thickness of >1 mm, preferably around 200 µm. The disadvantage of GB 233 58 84 is the processing of the active organic functional layer which requires a complicated process. The object of this invention is to provide a film which can be widely used, especially for manufacturing displays as a basis for the production of all components, such as the liquid crystal cell, the cell for housing the light-emitting layer in OLEDs or the electrode layer. It should meet not only the current requirements for film quality but future requirements as well and have the advantageous properties of both glass and plastic. The manufacturing method should be limited to the fewest possible steps and be as uncomplicated as possible.

The problem is solved by means of a glass-plastic composite film which is characterized in that on a general glass-plastic composite film the polymer layer is applied directly to at least one of the side faces so as to especially avoid the disadvantages of laminating and in that one side face on its surface has a waviness of less than 100 nm and/or a roughness RT<30 nm. It is particularly preferred if the streak is also less than 100 nm. For use in the field of electronic components and devices it is of particular advantage if the optical retardation does not exceed 20 nm. A particularly flexible composite is achieved if the thickness of the applied polymer layer is in the range between 1 µm and 100 µm.

The problem is also solved by the following two methods:

The first method includes the steps of manufacturing a glass film having a thickness of 10 to 500 µm by means of the down-draw process at a drawing rate of 2 to 12 m/min., pretreating the glass film surface, directly applying a polymer layer of 1 to 200 µm thickness in the liquid phase and cutting the polymer-coated glass film.

The second method comprises the same steps, where the glass film is cut after it is produced and before pretreating its surface and applying the plastic.

In contrast with the known laminating methods it is possible with the above methods to produce very thin and homogeneous polymer films on the glass film.

The glass-plastic composite film of the invention in the case of manufacturing displays is suitable because of its high surface quality both for further processing into a polarizer film and into a carrier plate for electrodes and for the use as an outermost protective sheet. Because of the plastic layer the film is resistant to breaking and lighter at the same time, because of the glass film layer it is scratch-proof, hard, mechanically stable and chemically inert. Depending on whether the glass side or the plastic side is processed further either the plastic side serves as break protection or the glass side serves as scratch protection. Because of the low double refraction the glass-plastic composite film of the invention is suitable especially for use in optoelectronic components and devices. The high surface quality of the composite film is of particular importance for manufacturing liquid crystal cells and luminous displays on the basis of light-emitting layers because rough surfaces can lead to defects in the display, as rough surfaces can easily lead to an uneven alignment of the liquid crystals in the applied orientation layers. Waviness leads to fluctuations in the layer thickness of the active layer (such as liquid crystals) and thus to an inhomogeneous display.

The roughness RT is determined in accordance with DIN 4762 Part 1-08.60 and corresponds to the max. distance between the profile top and the profile bottom within a reference path. It should not be confused with the roughness RA which corresponds to the arithmetical mean of all distances and generally is only a fraction of RT. The roughness describes the short-wave portion of the variation from an ideal flat surface. The waviness (measured according to DIN/ISO 11562 with a cutoff of 0.8 to 8.0 mm and 2CRPC 50 filter) describes the average wavelength portion of the variation from an ideal flat surface. The waviness is determined over a measured distance of 20 mm. The streak is measured with the same device parameters as the waviness, the measured length for analysis is 2 mm.

In a particularly preferred embodiment both sides of the glass-plastic composite film have the high surface quality of a waviness of less than 100 nm and a roughness RT of less than 30 nm. With this, the uses of the glass-plastic composite film are even more diversified because it can be further processed equally on either side and also opens up the potential of further processing it on both sides.

In order to achieve the lightest possible, thinnest possible glass-plastic composite film and above all having the highest surface quality it is indispensable that it does in fact only consist of the polymer and the glass film and that it has no adhesive layer.

Especially in the area of optoelectronic applications the optical retardation is advantageously <20 nm, preferably <15 nm, so as to suppress a distortion of the optical signals through the composite film.

With regard to reducing the weight and the thickness of displays the glass film layers preferably have thickness of 10 to 400 µm, particularly preferably 10 to 200 µm and especially preferably 10 to 100 µm, and the polymer layer preferably has a thickness of 2 to 100 µm, particularly preferably 2 to 50 µm, and the optical retardation does not exceed 15 nm.

Because a large portion of breaking glass in glass films is due to micro-cracks which begin at the edges it is advantageous if at least one edge of the glass-plastic composite film is fully covered by the plastic. This prevents both new cracks from developing and the propagation of existing cracks.

In order to make the glass-plastic composite film insensitive to punctual stresses, such as thrusts with a pointy object, it was found to be advantageous to select the polymers for the plastic layer such that their modulus of elasticity is <5,000 N/mm2, preferably <2,600 N/mm2, particularly preferably <1,500 N/mm2. The arising tensile stress is distributed by the polymer layer to a larger area and it is substantially reduced.

The modulus of elasticity of a very thin plastic layer can be determined by measuring the penetration depth of force. For this, a test piece of defined geometry, generally a diamond made pyramidal, is pressed into the surface under an increasing load and subsequently relieved again. The modulus of elasticity is the slope of the load relieving straight line (penetration depth in dependence of the load). The measurements are taken with a so-called pico indentor with which very small impression depths between 10 and 100 nm can be achieved. This is necessary because the substrate begins to affect the measurement when the penetration depth exceeds approx. 10% of the layer thickness.

It was found to be particularly advantageous to select a polymer for the plastic layer such that the transmission of the glass-plastic composite film is more than 90% of the uncoated glass film and the cloudiness from the polymer coating increases by less than 1% compared to the uncoated glass film.

In order to have as many options as possible for further processing the glass-plastic composite film and to ensure a long lifetime for the products manufactured on the basis of the glass-plastic composite film the glass-plastic composite film is advantageously continuous temperature-resistant (for several hours) up to 130° C. and short-time temperature-resistant (several minutes) up to 140° C., preferably 180° C., particularly preferably 200° C.

For the manufacture of LCD and OLED displays glass-plastic composite films were found to be particularly advantageous if they have a surface roughness RT of <10 nm, particularly preferably <3 nm, and a waviness of <80 nm.

Preferred materials for obtaining optimal glass-plastic composite films are silicone polymer, sol-gel polymer (such as Ormocere®, Nanocomposite), polycarbonate, polyether sulphone, polyacrylate, polyimide, cycloolefin copolymer or polyarylate for the plastic layer and borosilicate glass, aluminosilicate glass, aluminoborosilicate glass, preferably alkali-free borosilicate for the glass layer.

In order to produce a glass-plastic composite film the glass film itself has to be produced first. In order to produce a glass film with the required surface quality this should be done using the down-draw process at a drawing rate between 2 and 12 m/min. The surface quality of the glass film is the prerequisite for achieving a corresponding surface quality on the plastic side of the glass-plastic composite film. After producing the glass film it can either be directly processed further, or if the steps of pretreating the glass film surface and applying the polymer layer are spatially separated from the glass film production, it can be cut first, which is preferable for the production of smaller and medium-size quantities.

The glass film surface is pretreated so as to ensure good adhesion for the polymer layer.

Directly applying a polymer to the glass film surface without an adhesive agent, and in the liquid phase, achieves that the surface of the polymer layer reflects the surface of the glass film, so to speak, and that it has its excellent surface quality. If producing the glass film, pretreating and coating are planned as a continuous process the polymer-coated glass film is cut now.

The application in the liquid phase to the rigid glass film also ensures that no distortion orientation develops in the polymer film and therefore the optical retardation of the polymer film and thus the composite film is less than 20 nm.

If the glass film is cut before coating and if extremely thin polymer layers should be achieved the coating preferably takes place by means of spinning or spray spinning. Coating methods which are also suitable for a continuous process are pouring on, rolling on or spraying. Dipping is preferred for applying the polymer layer on both side faces of the glass film.

In order to increase the resistance to breaking at least one of the edges of the film should also be coated. In the continuous process the edges parallel with the drawing direction are coated, on cut film pieces all four edges can be coated.

With regard to the properties of the glass-plastic composite film to be produced it is advantageous to use glass films of 10 to 400 μm, preferably 10 to 200 μm and particularly preferably 10 to 100 μm, and to apply polymer layers of 1 to 200 μm, preferably 2 to 100 μm, and particularly preferably 10 to 85 μm. In order to increase the adhesion of the polymer layer on the glass film the best results are achieved with a surface treatment by UV irradiating the glass film surface in an ozone-containing atmosphere, by corona treatment or by flaming (?).

In order to support the hardening of the polymer layer the film should be irradiated with ultraviolet light and/or dried under the influence of heat.

Glass-plastic composite films with particularly good properties are obtained if the polymer used is either silicone polymer or sol-gel polymer or polycarbonate or polyether sulphone or polyacrylate or polyimide or cycloolefin copolymer or a polyarylate. Furthermore, with this method above all the use of borosilicate glass, preferably alkali-free borosilicate glass, is advantageous for producing the glass film.

The connection of the glass-plastic composite film of the invention with the production of electronic components and optoelectronic devices, especially on the basis of liquid crystals or light-emitting layers, is to be protected as well.

The invention will be explained by means of

FIG. 1: profile of the glass-plastic composite film at one of the edges and

FIG. 2 production line for producing the glass-plastic composite film, and by means of the following examples.

FIG. 1 shows a profile of a glass-plastic composite film at one of its edges. On the glass film 1 a polymer film 4 is applied directly to the glass film surface 2. Said polymer film 4 extends beyond the glass edge 3 and thus forms an edge enlargement 5 that fully covers the glass edge 3. In this manner, the edge of the glass-plastic composite film is also protected against jolts and the propagation of micro-cracks on the edge, which cracks may exist in the edge, is prevented.

FIG. 2 shows a potential production line for producing the glass-plastic composite film. In the glass drawing device 10 the glass film 15 is produced by means of the so-called modified down-draw method in that in a hot forming step the glass film 15 is vertically drawn out of the glass tank 11 and the debiteuse 12 and in that it is reformed, if necessary, in the cooling path 13. By directly connecting the coating path minimal contamination and surface variation of the glass surface are achieved before the subsequent coating, which is particularly favorable for the adhesive power of the polymer layer. With a minimal number of treatment, conveyance and intermediate storage steps surface damage and particle contamination are also reduced to a minimum. In order to compensate for an adjustment in the process rates and possible tolerances a buffer path 16 in the form of a loop is provided following the glass drawing device 10 which achieves that the glass drawing and the coating processes are separated. Because the glass film 15 largely hangs free an unacceptable warping of the glass film 15, which may lead to tearing, and the contamination of the glass surface are prevented.

In continuing, the glass film 15 is then guided horizontally over conveyor rollers 20 and its tensile stress is controlled via traction rollers 21 so as to ensure a constant conveyance speed and tensile stress and to prevent the glass film 15 from tearing. The surface to be coated is treated in the surface treatment device 22 by means of UV irradiation in an ozone atmosphere. In order to set the required glass temperature before applying the polymer a tempering unit 23 is provided in front of the coating module 24, which tempering unit preheats the ribbon of glass to a precisely defined, homogeneous temperature. The coating is applied by means of the coating module 24. The polymer 25 flows through the sheet die 26 to the transfer roller 27 and is rolled on by means of the latter to the glass film while applying minimal pressure (<1 kg/cm2). In the first drying path 28 the solvent is caused to evaporate. The evaporated solvent is carried back into the process after a conditioning or cleaning so as to reduce the environmental impact and the consumption. A higher temperature of the glass film 15 causes the solvent to evaporate quickly without forming a dry skin on the surface which would prevent the solvent enclosed in the volume from evaporating. Hardening and drying the polymer layer takes place in the UV irradiation path 30 and in the second drying path 31. At the end of the path is a coiling unit 33 with an intermediate layer uncoiling device 32 from which an intermediate layer is enveloped between the glass-plastic composite film layers. The glass-plastic composite film roll is then brought to the cutting equipment.

Exemplary Embodiment 1

Production of a Glass/Polysilicone Composite 100 $\mu$m/40 $\mu$m by Means of Roller Coating A glass film of borosilicate glass of the glass type D 263 (in-house publication Schott-DESAG) with a thickness of 100 $\mu$m is used, which is produced by means of the down-draw glass drawing method at a drawing rate of the glass ribbon of 5.5 m/min. The surface of the glass substrate has a waviness of 60 nm, a streak of 45 nm and a roughness RT of 9 nm. The surface of the ribbon of glass is activated by means of a corona treatment. The multimeter metal electrode has a width of 500 mm and the distance between the electrode and the glass surface is 2 mm. The frequency is 30–50 kHz (automatic frequency regulation) and the output is 150 W. The two-component silicone polymer film on the basis of polydimethyl siloxane (product name Elastosil of Wacker-Chemie GmbH, mixing ratio of the two silicone components 9:1) which is applied by means of a roller coating method has a thickness of 40 $\mu$m. The roller diameter is 238 mm and the roller length is 550 mm with an average press-on pressure of 0.5 kg/cm2. In a subsequent tempering process the silicone-coated ribbon of glass is hardened at 150° C. for 10 min. and subsequently cut. The modulus of elasticity of the silicone layer is 1100 N/cm2 and the surface has a waviness of 50 nm, a streak of 41 nm and a roughness of 20 nm. As a result of the roller coating the lateral edges lying parallel with the rolling direction are coated with the silicone polymer. The optical retardation is 15 nm.

Exemplary Embodiment 2

Production of a Glass/Polysilicone Composite 50 $\mu$m/2 $\mu$m by Means of a Spinning Process.

A glass film of an alkali-free borosilicate glass AF 45 (in-house publication Scholt-DESAG) is used with a film thickness of 50 $\mu$m, a waviness of 80 nm, a streak of 52 nm and a roughness RT of 4 nm. It is produced by means of the down-draw method at a drawing rate of 10 m/min. The film size is 300×200 mm2. The glass substrate is cleaned by means of a washing process and subsequently activated on the surface for 5 min. by means of a UV ozone treatment (amalgam low pressure radiator, 500 W) at 184.9 nm so as to generate ozone, at 253.7 nm so as to generate oxygen-centered radicals. By means of a spinning process (rotations 2400 1/min.) the glass film is coated with a one-component silicone elastomer (product name Elastosil) of Wacker-Chemie GmbH (dissolved in hexane at a polymer/hexane ratio of 1:21) and subsequently dried for 15 min. at 120° C. in a forced-air oven. The layer thickness is 2 $\mu$m. As a result of the spinning coating all four lateral edges are coated with the silicone polymer. The modulus of elasticity of the silicone layer is 500 N/mm2 and the surface has a waviness of 67 nm, a streak of 43 nm and a roughness RT of 9 nm. The optical retardation is 5 nm.

Exemplary Embodiment 3

D 263 Glass/Polycarbonate Composite 145 $\mu$m/3 $\mu$m by Means of a Spinning Process.

A glass film of the glass type D 263 (in-house publication Schott-DESAG) is used as glass substrate with a thickness of 145 $\mu$m, which is produced by means of the down-draw method at a drawing rate of 4.2 m/min., with a waviness of 28 nm, a streak of 12 nm and a roughness RT of 8 nm. The glass substrate is cleaned by means of a washing process and subsequently activated on the surface for 5 min. by means of a UV ozone treatment (amalgam low pressure radiator, 1000 W) at 184.9 nm so as to generate ozone, at 253.7 nm so as to generate oxygen-centered radicals.

By means of a spinning process (rotations 1400 1/min.) the glass film is coated with a polycarbonate film (polycarbonate/methylene chloride solution, at a ratio of 1:19) and subsequently dried for 20 min. at 80° C. in a forced-air oven. The layer thickness is 3 $\mu$m. As a result of the spinning coating all four lateral edges are coated with the polycarbonate film. The modulus of elasticity of the polycarbonate layer is 1350 N/mm2 and the surface has a waviness of 30 nm, a streak of 16 nm and a roughness RT of 9 nm. The optical retardation is 9 nm.

Exemplary Embodiment 4

AF 45 Glass/Polyether Sulphone (PES) 200 $\mu$m/85 $\mu$m by Means of Extruding.

A glass film of an alkali-free borosilicate AF 45 (in-house publication Schott-DESAG) with a film thickness of 200 $\mu$m is used. The surface of the glass substrate has a waviness of 55 nm, a streak of 36 nm and a roughness (RT) of 7 nm. The drawing rate of the ribbon of glass is 2.8 m/min.

The surface of the glass ribbon is activated by means of a corona treatment. The stick electrode has a width of 500 mm and the distance between the electrode and the glass surface is 4.5 mm. The frequency is 30–50 kHz (automatic frequency regulation) and the output is 250 W. The PES film applied by means of an extruding method at a drawing rate of 2.8 m/min. at 380° C. has a thickness of 85 $\mu$m. The glass-PES composite is cut after a 5 min. cooling period. The modulus of elasticity of the PES layer is 3200 N/mm2 and the surface has a waviness of 68 nm, a streak of 49 nm and a roughness RT of 15 nm.

As a result of the extrusion coating the lateral edges lying parallel with the drawing direction are coated with the PES polymer. The optical retardation is 18 nm.

Exemplary Embodiment 5

AF 45 Glass/Polyacrylate Composite 50 $\mu$m/10 $\mu$m by Means of Spray Coating.

A glass film of an alkali-free borosilicate glass AF 45 (in-house publication Schott-DESAG) is used with a film thickness of 50 $\mu$m, a waviness of 80 nm, a streak of 56 nm and a roughness RT of 4 nm. It is produced by means of the down-draw method at a drawing rate of 10 m/min. The film size is 300×200 mm2. The glass substrate is cleaned by means of a washing process and subsequently activated on the surface for 5 min. by means of a UV ozone treatment (amalgam low pressure radiator, 500 W) at 184.9 nm so as to generate ozone, at 253.7 nm so as to generate oxygen-centered radicals. The 10 $\mu$m thick polyacrylate layer is produced by means of a spraying process from an acrylate aerosol, where all four lateral edges are coated with the polymer. The spraying process used is the high pressure low volume (HPLV) method. The 10% polyacrylate solution in N,N-dimethyl ormamide which is preheated to 40° is sprayed via a spray nozzle that has a diameter of 0.6 mm, with an atomizing pressure of 0.55 bar and a feeder pressure for the nozzle of 4 bar. The modulus of elasticity of the acrylate layer is 5000 N/mm2 and the surface has a waviness of 75 nm, a streak of 48 nm and a roughness RT of 10 nm. The optical retardation is 8 nm.

Exemplary Embodiment 6

D 263 Glass/Cycloolefin Copolymer (COC) 145 µm/15 µm by Means of Extruding.

A glass film of the glass type D 263 (in-house publication Schoft-DESAG) is used as glass substrate with a thickness of 145 µm, which is produced by means of the down-draw method and has a waviness of 28 nm, a streak of 16 nm and a roughness RT of 8 nm.

The surface of the ribbon of glass is activated by means of a corona treatment. Three successively disposed multi-meter metal electrodes are used with a width of 500 mm each and with a distance from the glass surface of 7 mm. The frequency is 30–50 kHz (automatic frequency regulation) and the output per each metal electrode is 120 W. The drawing rate for the glass film is 4.2 m/min. The 15 µm thick COC film is applied by means of an extruding method at 4.2 m/min. at 270° C., where the glass edges parallel with the drawing direction are coated with the polymer. The coated glass ribbon is cut after a cooling period of 7 min. The surface has a waviness of 26 nm, a streak of 14 nm and a roughness RT of 15 nm, the modulus of elasticity is 2800 N/mm2. The optical retardation is 10 nm.

Exemplary Embodiment 7

D 263 Glass/Polyacrylate Composite 145 µm/3.5 µm by Means of a Dipping Method.

A glass film of the glass type D 263 (in-house publication Schott-DESAG) is used as glass substrate with a thickness of 145 µm, which is produced by means of the down-draw method, with a waviness of 28 nm, a streak of 16 nm and a roughness RT of 8 nm. The size of the glass substrate is 200×200 mm2. The glass substrate is cleaned by means of a washing process and subsequently activated on the surface for 5 min. by means of a UV ozone treatment (amalgam low pressure radiator, 1000 W) at 184.9 nm so as to generate ozone, at 253.7 nm so as to generate oxygen-centered radicals. The polyarylate is pre-dried in the oven at 130° C., and sodium-dried toluol is used as solvent. The 35 µm thick polyarylate film is applied by means of a dipping method (polyarylate/toluol ratio of 1:18, process temperature 80° C.) under nitrogen atmosphere and dried with a subsequent tempering process for 10 min. at 160°.

All four lateral edges are coated with the 3.5 µm thick polyarylate film. The modulus of elasticity is 2400 N/mm2 and the surface has a waviness of 19 nm, a streak of 11 nm and a roughness RT of 10 nm. The optical retardation is 8 nm.

Exemplary Embodiment 8

D 263 Glass/Silicone Resin Composite 100 µm/4.5 µm by Means of a Spinning Process.

A glass film of the glass type D 263 (in-house publication Schott-DESAG) is used as glass substrate with a thickness of 100 µm, which is produced by means of the down-draw method, with a waviness of 33 nm, a streak of 15 nm and a roughness RT of 6 nm. The size of the glass substrate is 100×100 mm2. The glass substrate is cleaned by means of a washing process and subsequently activated on the surface for 5 min. by means of a UV ozone treatment (amalgam low pressure radiator, 1000 W) at 184.9 nm so as to generate ozone, at 253.7 nm so as to generate oxygen-centered radicals. The glass film is coated with a methylphenyl silicone resin (product name Silres® of Wacker-Chemie GmbH, silicone resin/xylene solution ratio of 1:3) by means of a spinning method (rotations 5000 1/min.) and subsequently dried for 15 min. at 220° C. in a forced-air oven. The layer thickness is 4.5 µm. As a result of the spinning coating all four lateral edges are coated with the silicone resin. The surface has a waviness of 35 nm, a streak of 17 nm and a roughness RT of 9 nm. The optical retardation is 14 nm.

Reference List 1 glass film
2 glass film surface
3 glass edge
4 polymer film
5 edge enlargement
10 glass drawing device
11 glass tank
12 debiteuse
13 cooling path
14 rollers
15 glass film
16 buffer path
20 conveyor rollers
21 rollers
22 surface treatment device
23 tempering unit
24 coating module
25 polymer
26 sheet die
27 transfer roller
28 first drying path
29 extraction
30 UV irradiation path
31 second drying path
32 intermediate layer uncoiling device
33 coiling unit

What is claimed is:

1. Glass-plastic composite film, said composite film comprising a glass film having opposed side surfaces and a thickness between 10 µm and 500 µm, and a polymer layer applied on at least one of said side surfaces of said glass film, said polymer layer having a thickness between 1 µm and 200 µm with said polymer layer being applied directly to said at least one of said side surfaces, and wherein at least one side of said composite film has a waviness of less than 100 nm and a roughness RT<30 nm.

2. Glass-plastic composite film as per claim 1, characterized in that the optical retardation does not exceed 20 nm.

3. Glass-plastic composite film as per claim 1, characterized in that the glass film has a streak that is less than 100 nm.

4. Glass-plastic composite film as per claim 1, characterized in that both sides of their surface have a waviness of less than 100 nm and a roughness RT of less than 30 nm.

5. Glass-plastic composite film as per claim 1, characterized in that the glass thickness is 10 to 400 µm.

6. Glass-plastic composite film as per claim 1, characterized in that the thickness of the polymer layer is 2 to 100 µm.

7. Glass-plastic composite film as per claim 1, characterized in that the film is also provided with the polymer layer on at least one of its edges.

8. Glass-plastic composite film as per claim 1, characterized in that the polymer layer has a modulus of elasticity of <5,000 N/mm2.

9. Glass-plastic composite film as per claim 1, characterized in that the transmission of the glass-plastic composite film is more than 90% of the uncoated glass film and that the cloudiness as a result of the polymer coating increases by less than 1%.

10. Glass-plastic composite film as per claim 1, characterized in that the roughness of the surface RT is <20 nm, that the waviness of the surface is <80 nm, and that the optical retardation does not exceed 15 nm.

11. Glass-plastic composite film as per claim 1, characterized in that in continuous use the film is temperature-resistant up to 130° C., and that for short-time heating the film is temperature-resistant up to 140° C.

12. Glass-plastic composite film as per claim 1, characterized in that the polymer layer consists of a silicone polymer, a sol-gel polymer, a polycarbonate, a polyether sulphone, a polyacrylate, a polyimide, a cycloolefin copolymer, a polyarylate or a silicone resin.

13. Glass-plastic composite film as per claim 1, that the glass film consists of an aluminosilicate glass, aluminoborosilicate glass, borosilicate glass, preferably an alkali-free borosilicate glass.

14. Method for producing a glass-plastic composite film as per claim 1, comprising the steps:
producing a glass film having a thickness of 10 to 500 μm using the down-draw process at a drawing rate of 2 to 12 m/min.;
pre-treating the glass film surface;
directly applying a 1 to 200 μm thick polymer layer in the liquid phase;
cutting the polymer-coated glass film.

15. Method for producing a glass-plastic composite film as per claim 1, comprising the steps:
producing a glass film having a thickness of 10 to 500 μm using the down-draw process at a drawing rate of 2 to 12 m/min.;
cutting the glass film;
pre-treating the glass film surface;
directly applying a 1 to 200 μm thick polymer layer in the liquid phase.

16. Method according to claim 15, characterized in that the polymer layer is applied by means of spinning or spray spinning.

17. Method according to claim 14, characterized in that the polymer layer is applied by means of pouring on or rolling on or spraying or dipping.

18. Method according to claim 14, characterized in that in addition to the side face at least one edge is coated.

19. Method according to claim 14, characterized in that a glass film having a thickness of 10 to 400 μm, preferably 10 to 200 μm, particularly preferably 10 to 100 μm is produced in the glass drawing device by means of the down-draw method.

20. Method according to claim 14, characterized in that the coating produces a polymer layer thickness of 2 to 100 μm, preferably 2 to 50 μm.

21. Method according to claim 14, characterized in that the surface treatment is performed before the coating with UV irradiation in an ozone-containing atmosphere or with a corona treatment or with flaming (?).

22. Method according to claim 14, characterized in that subsequent to coating the polymer coating is hardened by means of UV irradiation and/or dried under the influence of heat.

23. Method according to claim 14, characterized in that the polymer consists of a silicone polymer, a sol-gel polymer, a polycarbonate, a polyether sulphone, a polyacrylate, a polyimide, a cycloolefin copolymer, a polyarylate or a silicone resin.

24. Method according claim 14, characterized in that for producing the glass film of an aluminosilicate glass, aluminoborosilicate glass, a borosilicate glass, preferably an alkali-free borosilicate glass is used.

25. Use of the glass-plastic composite film as per claim 1 for manufacturing electronic components and optoelectronic devices, especially on the basis of liquid crystals or light-emitting layers.

26. Glass-plastic composite film as per claim 1, characterized in that the glass film has a streak that is less than 50 nm.

27. Glass-plastic composite film as per claim 1, characterized in that the glass film has a streak that is less than 30 nm.

28. Glass-plastic composite film as per claim 1, characterized in that the glass thickness is 10 to 200 μm.

29. Glass-plastic composite film as per claim 1, characterized in that the glass thickness is 10 to 100 μm.

30. Glass-plastic composite film as per claim 1, characterized in that the thickness of the polymer layer is 2 to 50 μm.

31. Glass-plastic composite film as per claim 1, characterized in that the polymer layer has a modulus of elasticity of <2,600 N/mm2.

32. Glass-plastic composite film as per claim 1, characterized in that the polymer layer has a modulus of elasticity of <1,500 N/mm2.

33. Glass-plastic composite film as per claim 1, characterized in that the roughness of the surface RT is <20 nm, that the waviness of the surface is <50 nm, and that the optical retardation does not exceed 15 nm.

34. Glass-plastic composite film as per claim 1, characterized in that the roughness of the surface RT is <20 nm, that the waviness of the surface is <30 nm, and that the optical retardation does not exceed 15 nm.

35. Glass-plastic composite film as per claim 1, characterized in that the roughness of the surface RT is <10 nm, that the waviness of the surface is <80 nm, and that the optical retardation does not exceed 15 nm.

36. Glass-plastic composite film as per claim 1, characterized in that the roughness of the surface RT is <10 nm, that the waviness of the surface is <50 nm, and that the optical retardation does not exceed 15 nm.

37. Glass-plastic composite film as per claim 1, characterized in that the roughness of the surface RT is <10 nm, that the waviness of the surface is <30 nm, and that the optical retardation does not exceed 15 nm.

38. Glass-plastic composite film as per claim 1, characterized in that in continuous use the film is temperature-resistant to 130° C., and that for short-time heating the film is temperature resistant to 180° C.

39. Glass-plastic composite film as per claim 1, characterized in that in continuous use film is temperature-resistant to 130° C., and that for short-time heating the film is temperature-resistant to 200° C.

40. Glass-plastic composite film as per claim 1 wherein said glass composite film is disposed within an electronic component.

* * * * *

UNITED STATES PATENT AND TRADEMARK OFFICE
CERTIFICATE OF CORRECTION

PATENT NO. : 6,815,070 B1
DATED : November 9, 2004
INVENTOR(S) : Roland Bürkle et al.

It is certified that error appears in the above-identified patent and that said Letters Patent is hereby corrected as shown below:

Column 13,
Line 14, after "claim 1" insert -- characterized in --.

Signed and Sealed this

Twenty-second Day of February, 2005

JON W. DUDAS
*Director of the United States Patent and Trademark Office*